United States Patent [19]

Schumacher et al.

[11] Patent Number: 5,795,018
[45] Date of Patent: Aug. 18, 1998

[54] PASSENGER SERVICE TERMINAL PARTICULARLY IN PASSENGER CABIN OF AN AIRCRAFT

[75] Inventors: Markus Schumacher; Andrew Muin, both of Buxtehude, Germany

[73] Assignee: Daimler-Benz Aerospace Airbus GmbH, Hamburg, Germany

[21] Appl. No.: 714,204

[22] Filed: Sep. 16, 1996

[30] Foreign Application Priority Data

Sep. 14, 1995 [DE] Germany .................. 195 33 981.9

[51] Int. Cl.$^6$ .................. A47C 7/16; A47C 29/00
[52] U.S. Cl. .................. 297/184.17; 297/217.3; 244/118.5
[58] Field of Search .................. 297/217.1, 217.3, 297/217.5, 184.14, 184.17, 184.16; 244/118.5, 118.6; 5/416

[56] References Cited

U.S. PATENT DOCUMENTS 4,774,514  9/1988  Hildebrandt et al. .

FOREIGN PATENT DOCUMENTS 3444802   6/1986   Germany .
3719105   12/1988  Germany .
4227377   2/1993   Germany .
4301681   10/1994  Germany .

*Primary Examiner*—Peter M. Cuomo
*Assistant Examiner*—Anthony D. Barfield
*Attorney, Agent, or Firm*—W. F. Fasse; W. G. Fasse

[57] ABSTRACT

A passenger service terminal, for example in an aircraft, includes comfort and service components such as a reading lamp, a flight attendant call button, a loudspeaker, an air nozzle, an oxygen mask, an oxygen generator, and an optical display element incorporated in a separate support bail or support rod that cooperates with but remains separate from a passenger seat. An air supply duct and electrical and optical conductors pass through seat components. A bail or bow (8) forming a support, at least partly, frames the backrest and holds at least certain service and comfort components while simultaneously forming a privacy hood (19). Alternatively, side rods (8A) are arranged laterally and alongside the backrest (5) to hold lateral curtains (19A) also providing some privacy. The side rods are preferably hollow to hold an air supply duct, wiring and optical conductors. A seated passenger can easily and comfortably operate the service functions without disturbing a neighbor.

20 Claims, 3 Drawing Sheets

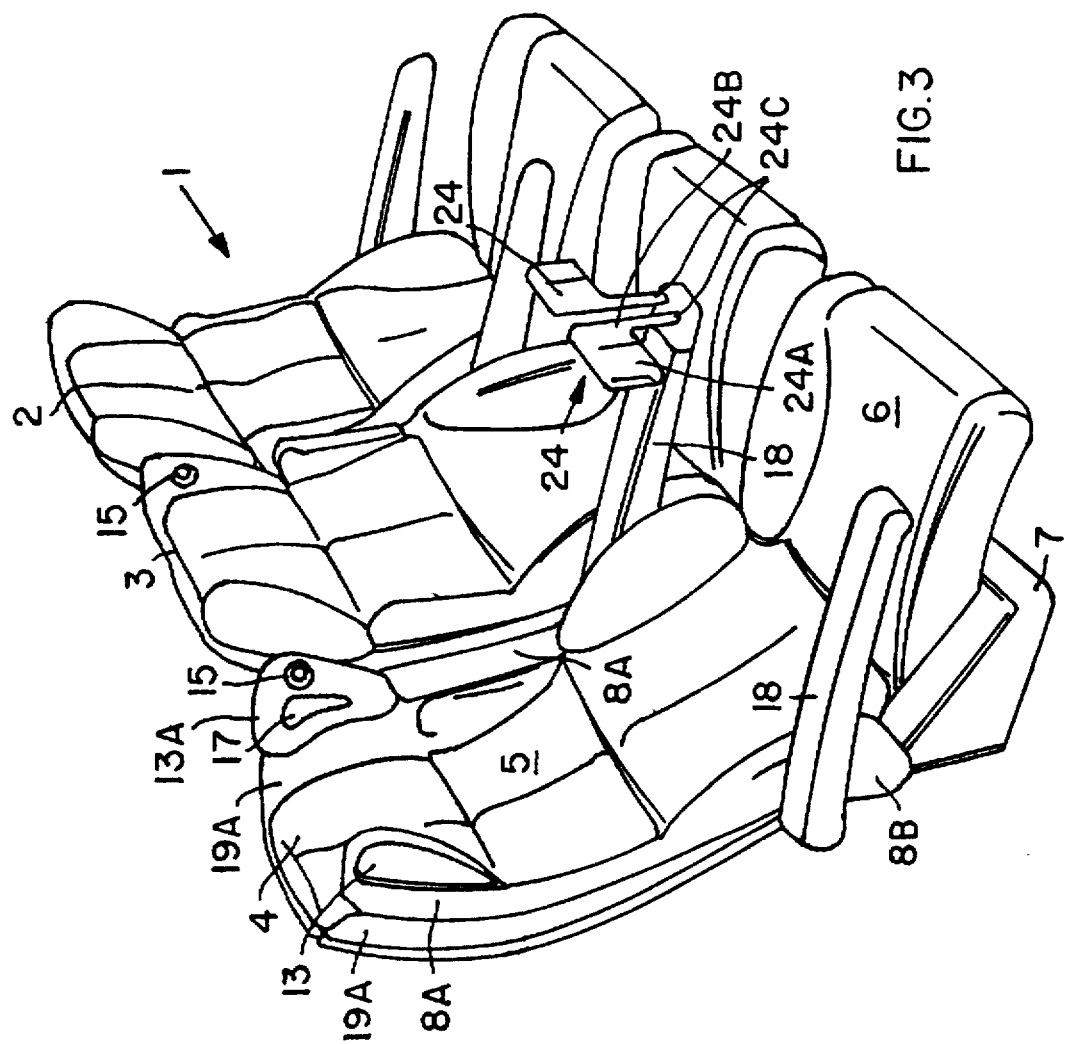

PASSENGER SERVICE TERMINAL PARTICULARLY IN PASSENGER CABIN OF AN AIRCRAFT

CROSS-REFERENCE TO RELATED APPLICATIONS

The present application relates to our copending, commonly assigned application U.S. Ser. No. 08/714,781 filed simultaneously herewith, (our Docket No. 3332).

FIELD OF THE INVENTION

The invention relates to a passenger service unit or terminal, particularly in a passenger cabin of an aircraft. Such a passenger service unit contains passenger comfort and service elements, for example a reading lamp, a flight attendant call button, a loudspeaker, an air nozzle, an oxygen mask including an oxygen source or generator, optical indicator elements, and feed lines between a supply line and the service unit or terminal.

BACKGROUND INFORMATION

German Patent Publication DE 43 01 681 C1 corresponding to U.S. Pat. No. 5,556,332 (Schumacher) issued on Sep. 17, 1996 describes such service units, called passenger service units (PSU), in a passenger aircraft cabin. The PSUs are provided for each row of seats and are mounted beneath the luggage compartments arranged in the upper area of the cabin. Increasingly, such luggage compartments are being fitted with a flap or shell that can be lowered. Such lowerable flaps, however, do not allow a service unit to be positioned in the middle area of a row of seats because the service unit would interfere with the luggage compartment flap when the flap is lowered. Consequently, the service units are conventionally displaced away from the middle area toward the cabin windows, where they are not readily accessible to the passengers sitting in the aisle seats. This creates an area of conflict between passengers, in that passengers, particularly those who cannot conveniently reach the service units, can annoy other passengers when trying to access the service units.

Another consideration for the passengers' comfort takes into account, that the cabin should present a spacious appearance. The arrangement of the service unit in the upper area of the cabin detracts from the otherwise spacious positive impression. The free and clear head room is limited by the space needed by each passenger to access a respective service unit, whereby the inner contour of the cabin is correspondingly low at this location. Furthermore, conventional service units also require repositioning when the seating layout is changed. This requirement results in substantial additional time and effort for assembly and maintenance of the seating arrangement or layout.

It is also known that certain elements for passenger comfort and service can be arranged in the passenger seats. For example, German Patent Publication DE 37 19 105 A1 (Keiper) published Dec. 22, 1988 shows a passenger seat in which communication elements such as receiver components, loud speakers, video connections, control elements, and reading lamps are integrated. The communication and control elements are part of a wireless information system and are powered by an energy source that is allocated to the specific seat.

German Patent Publication DE 42 27 377 A1 (Beroth) published on Feb. 25, 1993 discloses another passenger seat which contains an emergency oxygen system. This publication, however, does not show how additional components are arranged for supplying passenger services.

German Patent Publication DE 34 44 802 C2 (Sprenger et al.) published on Jun. 12, 1986 discloses passenger seats with data terminals arranged in the passenger seat, particularly in the rear side of the seat backrest, whereby passengers can select service, monitoring, entertainment, information, and management functions. According to Sprenger et al., a passenger can use these terminals to gather certain information, perform certain work, or for entertainment. However, Sprenger et al. discloses nothing about the arrangement of other systems that are relevant to passengers, such as flight attendant calls, on-board speaker system, reading lamps and air nozzles.

The above prior art thus shows that single components or individual systems that function for the most part independently of a central supply and service system, can be integrated into a seat and thus become a structural part of the seat. However, a functional consolidation of all components that are available to the passenger, in the form of an integral service unit, separate from the passenger seat, and fed from one supply line, is not known.

OBJECTS OF THE INVENTION

In view of the above it is the aim of the invention to achieve the following objects singly or in combination:

to arrange a passenger service unit or terminal in a simple manner within the passenger cabin so as not to interfere with other cabin components yet without full integration into a passenger seat structure;

to construct such a terminal so that all service functions for the respective passenger are integrated in one conveniently accessible passenger service terminal that is positioned as close as possible to the passenger seat but not an integral part thereof;

to make sure that such an integral terminal is comfortably within the reach of a seated passenger to whom that terminal is assigned;

to avoid an integration of components or systems performing aircraft specific functions relating to all passengers into a flight passenger seat proper;

to avoid placing components that would disturb the immediate head area of a passenger while still utilizing the space available directly above the backrest of an aircraft passenger seat; and to adapt a passenger service terminal to a passenger seat configuration without integrating the terminal into the seat.

SUMMARY OF THE INVENTION

The above objects have been achieved according to the invention in a passenger service terminal arranged as an additional component of each passenger seat, wherein the terminal is constructed as a backrest extension bail or bow which at least partially frames a top portion of the backrest. The extension bail or bow is operatively secured to the seat structure, preferably to the support frame of the passenger seat.

In one embodiment the bail or bow is rigidly secured to the lower seat support structure and a bellows type hood is expanded between the bail or bow and the backrest when the backrest of the seat is caused to lean back. In another embodiment the bail or bow is hinged to the seat support structure and a hinge lock permits a rigid connection or a hingeable connection between the bow and the seat support structure. When the bow is held in a fixed position by the hinge lock, leaning back of the backrest will expand the bellows type hood. However, when the bow is in a hingeable position with a hinge lock released, the bellows type hood may be expanded even with the backrest in an upright position by pushing the bail or bow forwardly. Once the bellows type hood is expanded the bow is again fixed by the hinge lock. In both instances the bellows type hood is secured between the bow and the backrest.

It is a particular advantage of the invention that a passenger sitting in his seat can access the service functions comfortably, without disturbing his neighbors. By eliminating passenger service functions from the area directly beneath the luggage compartments, a more generous impression of space in the passenger cabin is obtained. This feature has a positive effect on the comfort and sense of well-being of the passengers. Furthermore, allocation of the passenger service unit or terminal for all passenger service functions to the passenger seat avoids any need for adapting the passenger service unit or terminal when the seating layout is changed. This feature is a significant improvement in the flexibility of changing the seating arrangement or layout.

By consolidating all individual service components such as a reading light, an air nozzle, a loudspeaker, a display, and an operating panel into one service unit or terminal separate mountings for these comfort and service components can be avoided, thus reducing the time and effort expended in assembly and maintenance work. A functional, clear, and orderly arrangement of the terminal components has been achieved, whereby the operation of the service functions by the passenger is facilitated.

Further features of the invention provide an individual private or quiet space for each passenger. Thus, sleeping passengers can be shielded from cabin light and disturbing influences caused by neighbors. A further embodiment places wiring conductors and feed lines for the passenger comfort and service elements inside the seat base frame, or the hollow space in the seat base frame is itself used as a guide or channel, for example for feeding air to the passenger in the respective seat.

In a further embodiment, additional service functions are easily accessible and within the immediate reach of the passenger with comfort and operating components positioned in the rear portion of the terminal, whereby these comfort and operating components are provided for a passenger in a seat behind the seat in which the comfort and operating elements are arranged. A further embodiment provides each passenger seat with separate, individual visual programming including a respective display unit, wherein the projection apparatus can be folded out or folded under the inner side of the extension bail or bow. The present individual terminal is connectable in several ways to a central supply line while still permitting an individual control of all service and comfort functions by the passenger.

BRIEF DESCRIPTION OF THE DRAWINGS

In order that the invention may be clearly understood, it will now be described, by way of example, with reference to the accompanying drawings, wherein:

FIGS. 1A and 1B show an armrest front end used as a control keyboard and display panel of the present passenger service terminal;

FIG. 3 shows a seating group combined with another embodiment of the present service terminal having two lateral backrest rods as supports for the service and comfort components including lateral light shields or blinds.

DETAILED DESCRIPTION OF PREFERRED EXAMPLE EMBODIMENTS AND OF THE BEST MODE OF THE INVENTION

Figure 1:
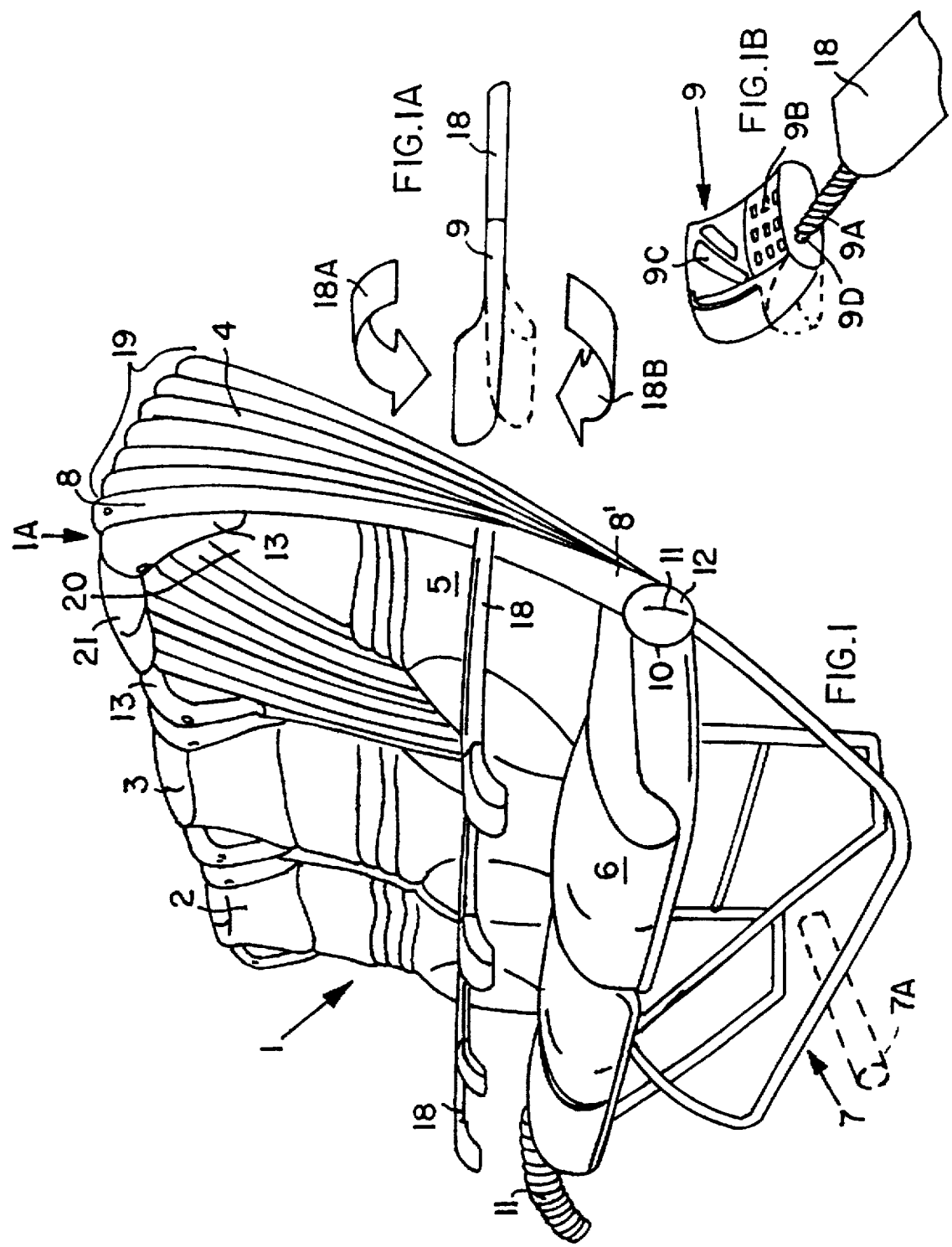
FIG. 1 shows a perspective view of a group of three passenger seats illustrating one embodiment of the present service terminal or unit constructed with an extension bail or bow as a support for comfort and service components including a bellows-type hood shown in its expanded state to provide a privacy space around a head of a passenger.

FIG. 1 shows a seat group 1 comprising several seats 2, 3, 4, each of which has a backrest 5 and a seat cushion 6. The seats 2, 3, 4 are fixedly arranged on a support frame 7. A service unit or terminal 1A that contains all essential passenger comfort and service components is individually allocated to each seat 2, 3, 4 without being integrated into the respective seat. Thus, a passenger can access comfortably the passenger comfort and service components without disturbing any neighbors. Each service unit or terminal allocated to a respective seat is so constructed that the passenger service functions are provided within easy reach and without disturbing a passenger in a neighboring seat.

Figure 2:
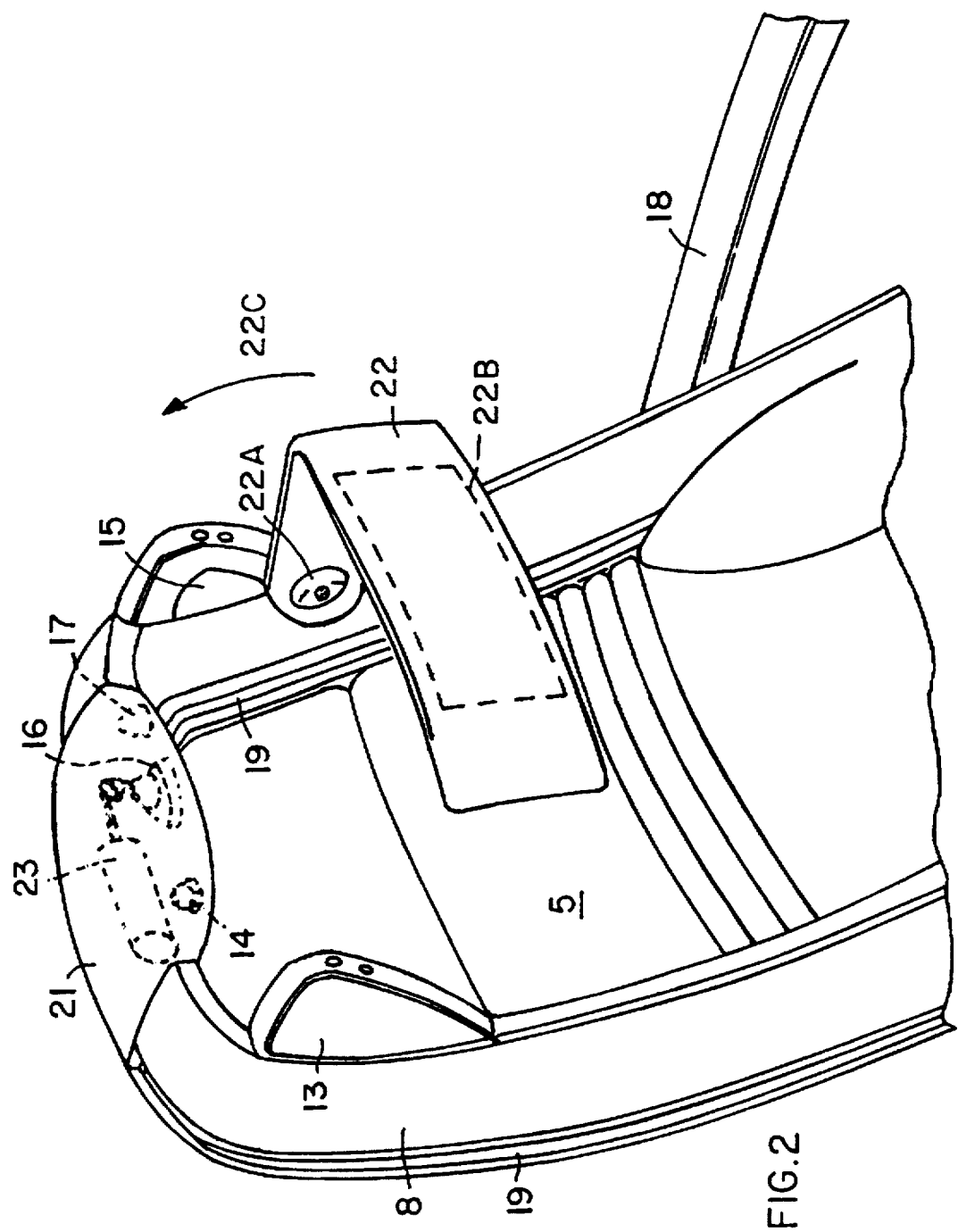
FIG. 2 shows a partial perspective view of the seat of FIG. 1 with a further component in the form of a tiltable display screen of the present terminal and with the hood folded.

The embodiment of the service unit in FIG. 1 shows a bail or bow 8 as a structural extension or additional component of each seat 2, 3, 4. The bow or bail 8 is preferably embodied as a hollow and rigid tubular frame member and forms a support for various service and comfort components. In the embodiment of FIGS. 1 and 2 the bow 8 at least partly surrounds or frames the contour of the backrest 5. The bow or bail 8 has side rods with lower ends 8' preferably secured to a hinge or journal 10. However, the lower rod ends 8' may alternatively be rigidly or tiltably and lockably secured to the cabin floor. All passenger service functions that are allocated to the respective seat are arranged in or on the bail 8 and operating buttons or the like are arranged in the front end of an armrest to be described with reference to FIGS. 1A and 1B. The supply lines namely electrical and optical conductors and air ducts, to the passenger service and comfort components are arranged within the hollow bail or bow 8 or the hollow space in the bail or bow 8 can itself be used as a duct, for example as a flow duct for fresh air.

FIGS. 1A and 1B show an arrangement of a control keyboard with buttons for operating or selecting comfort and service components in or on the bail or bow 8. For this purpose the free end 9 of an armrest 18 is constructed as a control unit. The opposite end of the armrest 18 is secured to the bail 8 as shown in FIG. 1. Flexible electrical conductor wires 9A connect control buttons 9B and a display screen 9C to respective comfort and service components such as a light for reading, air nozzle controls, loudspeakers, a selections for video and audio programs and so forth. The end 9 of the armrest 18 is rotatable as indicated by arrows 18A and 18B through an angular range of for example 180° from a position in which the control buttons 9B and the display screen 9C face downwardly, thereby not interfering with the use of the armrest 18 as such, into a position with the control buttons 9B and display screen 9C facing upwardly for using these elements 9B, 9C for their intended purpose. The rotation range is limited to protect the conductors 9A. The spacing between the armrest 18 and its end in FIG. 1B is merely shown to illustrate the conductors 9A which preferably surround a connector shaft 9D that operatively connects the end 9 to its armrest 18. A lock, not shown, e.g. mechanical or magnetic, locks the free end 9 to the armrest 18 in one or the other of the two above described positions.

Alternatively, the control unit in the free end; can be pulled out of the armrest 18 for easy operation (FIG. 1B).

The bail or bow 8 is preferably rigidly attached to the support frame 7 of the seating group 1. As mentioned, the bail may alternatively be hinged with a position lockable hinge or journal 10 to the frame 7. The hinge or journal 10 preferably serves as a journal axis for the backrest 5. A flexible supply line or hose 11 provides a connection between each of the bails or bows 8 of the seats 2, 3, and 4 and a maim supply line of a central supply system (not shown) positioned near or behind the aircraft wall panelling. The main supply line contains the necessary functional components such as separate electrical conductors, fiber optical cables, and air duct for all the passenger comfort and service components provided for each seat or group of seats. The air ducts feed, for example fresh air or oxygen to air nozzles 17. The electrical conductors provide electrical power to a reading lamp 14 and signal transmission lines for audio and visual display elements 9C and buttons 9B in the free end 9 forming a control panel.

A blind cover 12 covers the end of the supply line or tube 11 that faces the aisle. Instead of passing the main supply line in the form of a flexible hose 11 through the hollow journal or hinge 10, a main supply line 7A could be arranged in the floor structure, whereby the individual ducts and conductors run through the hollow tubular members of the support 7 connected to seat rails (not shown) in the cabin floor.

According to the invention as shown in the embodiment of FIGS. 1 The opposite end of the armrest 18 is secured to the bail 8 as shown in FIG. 1. and 2, each passenger seat 2, 3, 4 is provided with an expandable flexible hood 19, whereby a privacy space 20 is created especially for a sleeping passenger because the expanded hood 19 shields the passenger from the cabin light and disturbing influences caused by neighbors. Each hood 19 is arranged between the adjustable backrest 5 and the rigid bail or bow 8 and edges of the hood are secured to the bail 8 and to the backrest 5. When the backrest 5 is lowered or tilted back about the journal 10 to the sleep position and the bail or bow 8 remains in its upright position, the flexible hood 19 is expanded since it works like a wall of a bellows. However, it is also possible to expand the hood by mounting the bail 8 in a hinged manner to the journal 10 provided the bail 8 can be locked in different angular positions. In such an embodiment the hood can be expanded even if the backrest 5 is in its upright position. In both embodiments the bellows-type hood 19 is connected with the bail or bow 8 and with the backrest 5. When the backrest 5 is leaned back to a resting or sleeping position, or the bail 8 tilted forward, the privacy space 20 is formed. When the backrest 5 is in its upright position, the hood 19 normally folds together and is covered by the bail or bow 8, unless the latter is tilted forwardly.

FIG. 2 shows the hood 19 folded together and an arrangement of certain passenger comfort and service components is secured in or on the bail or bow 8 in the head area of a passenger seat. The bow or bail 8 is provided with a head section 21 above the head of the passenger. This head section 21 holds important service components. Preferably, an oxygen mask 16 is normally positioned above the head of the passenger. The oxygen mask 16 drops on demand into the immediate vicinity of the face of the passenger and can be immediately grabbed. An oxygen generator 23, air nozzles 17, and a reading lamp 14 are also integrated into the head section 21 of the bail 8. An advantageous illumination is achievable by fiber optic components forming the lamp 14.

A lateral sight blind 13 is arranged on both sides of the upper portion of the bail or bow 8 to the right and left of the head section. At least one blind, preferably each blind contains a loudspeaker 15 that can be used for general announcements as well as for individual audio programs.

A projection visor 22 is secured by a hinge or journal 22A to the bail or bow 8 and can be tilted out from under the inner side of the head section 21 of the bow or bail 8. A projection screen 22B or surface with virtual focus (sensor round visor) is provided on the inner side of this projection visor 22. Thus, visual information or individual video programs can be made available to the passenger who makes the selection with the aid of a respective key or button 9B. If the projection visor 22 is not being used, it can be tilted back up under the head section 21 as indicated by the arrow 22C, thereby removing the visor 22 from the passenger's area of vision and motion.

FIG. 3 shows another embodiment with seats 2, 3, and 4 each of which may be equipped with two side rods 8A that extend upwardly along lateral sides of the backrest 5 to form support members 8A. The lower end 8B of each support member 8A is secured to the frame or base 7. A sight blind 13 is attached to each upper end of each support side rod 8A. The head section 21 shown in FIG. 2 is not used in the embodiment of FIG. 3 so that the two rods 8A are not interconnected to form a bail or bow. The passenger service components that are arranged in the head element 21 shown in FIG. 2, are arranged in the embodiment of FIG. 3 in the sight blinds 13 or in the side rods 8A. Instead of the hood 19, flexible side curtains 19A are arranged between each rod 8A and the respective edge of the backrest 5. These side curtains spread out to cover the lateral areas as a lateral shield when the backrest leans back or the respective rod is tilted forward and fixed in such forward position. This covering by the side curtains 19A is represented by the stippling shown on seat 4. When the backrest 5 is in its upright position, the lateral curtains 19A are covered by the respective side rod 8A which is wide enough for this purpose.

FIG. 3 also shows air nozzles 17 and loudspeakers 15 positioned in the blinds 13. A lamp and an oxygen mask may be arranged in one and the other blind 13, respectively. These comfort and service elements are controlled through control buttons provided in a control unit 24 having a section 24A with control buttons facing a person sitting in the respective seat and a section 24B for a display screen. These control terminals 24 are connected to the forward end of the respective armrests 18 and can be moved out of the way if desired, with the help of a post 24C. The wiring for these terminals 24 passes through the hollow armrest 18 into the respective side rod 8A to which the back end of the respective armrest 18 is connected as seen in FIG 3.

By eliminating the passenger service functions and components from the area below the luggage compartments, a more spacious impression of the passenger cabin is achieved, which has a positive effect on the comfort and sense of well-being of the passengers who now can conveniently select and operate the service functions. Furthermore, an arrangement as disclosed herein saves time- and work-consuming efforts when it becomes necessary to provide a different seating arrangement because the passenger service components and functions are movable with the respective seats. These features of the invention significantly increase the layout flexibility of the seating arrangement.

Although the invention has been described with reference to specific example embodiments, it will be appreciated that it is intended to cover all modifications and equivalents within the scope of the appended claims.

What is claimed is:

1. An aircraft passenger seat comprising a support (7), a seat mounted on said support, a backrest (5), a hinge (10) hinging said backrest to said support (7), a bail (8) comprising a head section (21) and two side rods interconnected by said head section and extending downwardly to said hinge (10), a flexible hood (19) having a first edge secured to said bail (8) and a second edge secured to said backrest, each of said side rods of said bail comprising a rod end (8') rigidly secured to said hinge (10) so that moving the backrest rearwardly extends said hood, and at least one passenger service and comfort component selected from the group consisting of an oxygen mask (16), an oxygen generator (23), an air nozzle (17), a reading light (14) and a loudspeaker installed in said bail.

2. The aircraft passenger seat of claim 1, wherein said flexible hood (19) comprises bellows folds which are folded together when said bail (8) and said backrest of said passenger seat are close together and which fold out when a spacing between said bail and said backrest (5) is increased.

3. The aircraft passenger seat of claim 1, wherein said bail (8, 8A) is made of hollow tubular stock, and further comprising at least one supply line for said service and comfort component, said supply line passing through said hollow tubular stock.

4. The aircraft passenger seat of claim 1, further comprising a display screen (22) and a journal (22A) tiltably securing said display screen (22) to said bail (8) for moving said display screen (22) between a use position and a recessed position.

5. The aircraft passenger seat of claim 1, further comprising a flexible hollow supply hose (11), electrical and optical conductors passing through said hollow supply hose (11) for connecting said service and comfort components to a central supply.

6. The aircraft passenger seat of claim 1, further comprising an armrest (18) having a forward free end and a back end, said back end being secured to said bail (8), and operating elements for operating said service and comfort component, said operating elements being secured to said forward free end of said armrest.

7. The aircraft passenger seat of claim 6, wherein said operating elements form a control unit (9) constructed as an end section of said armrest (18), said ends section comprising a tilting mount (9D) securing said end section to said armrest (18).

8. The aircraft passenger seat of claim 7, wherein said control unit (9) comprises a display screen (9C).

9. The aircraft passenger seat of claim 1, wherein said at least one passenger service and comfort component is installed in said head section (21) of said bail (8).

10. The aircraft passenger seat of claim 1, further comprising a lateral blind (13) secured to an upper end of at least one of said side rods of said bail (18), and wherein at least one of said service and comfort components is installed in said lateral blind.

11. The aircraft passenger seat of claim 10, wherein said side rods are hollow, and comprising at least two of said service and comfort components including at least an air nozzle (17) and a loudspeaker (15) installed in said lateral blind (13), and supply lines for said service and comfort components passing through said hollow side rods.

12. An aircraft passenger seat comprising a support 7, a seat mounted on said support, a backrest (5), a hinge (10) hinging said backrest to said support (7), a bail (8) comprising a head section (21) and two side rods having upper ends interconnected by said head section (21), a flexible hood (19) having a first edge secured to said bail (8) and a second edge secured to said backrest, said side rods having lower ends (8') hingedly secured to said hinge (10) so that tilting one of said backrest and said bail extends said hood (19), and further comprising at least one passenger service and comfort component selected from the group consisting of an oxygen mask (16), an oxygen generator (23), an air nozzle (17), a reading light and a loudspeaker installed in said bail.

13. The aircraft passenger seat of claim 12, wherein said flexible hood (19) comprises bellows folds which are folded together when said bail (8) and said backrest of said passenger seat are close together and which fold out when a spacing between said bail and said backrest (5) is increased, and further comprising at least one lateral blind (13) secured to one of said side rods of said bail, and at least one service and comfort component in said lateral bail.

14. The aircraft passenger seat of claim 12, further comprising an armrest (18) having a forward free end and a back end, said back end being secured to said bail (8), and operating elements for operating said service and comfort component, said operating elements being secured to said forward free end of said armrest.

15. The aircraft passenger seat of claim 12, wherein said operating elements form a control unit (9) constructed as an end section of said armrest (18), said end section comprising a tilting mount (9D) securing said end section to said armrest (18).

16. The aircraft passenger seat of claim 12, wherein said control unit (9) comprises a display screen (9C).

17. An aircraft passenger seat, comprising a base (7), a seat mounted on said base (7), a backrest (5), a hinge hinging said backrest to said support, two side rods (8A) having upper ends extending laterally along sides of said backrest (5) and lower ends (8B) secured to said base (7), a flexible curtain (19A) secured between said backrest and each of said side rods (8A), so that relative movement between said side rods and said backrest away from each other expands said flexible curtain (19A) and relative movement between said side rods and said backrest toward each other folds said flexible curtain, a lateral blind (13A) secured to an upper end of at least one of said side rods (18A), and further comprising at least one passenger service and comfort component selected from the group consisting of an oxygen mask (16), an oxygen generator (23), an air nozzle (17), a reading light and a loudspeaker installed in said lateral blind (13A).

18. The aircraft passenger seat of claim 17, further comprising an armrest (18) connected to at least one of said side rods and a control unit (24) secured to said armrest (18).

19. The aircraft passenger seat of claim 17, wherein said control unit (9) comprises a display screen (9C).

20. The aircraft passenger seat of claim 17, wherein said side rods are hollow, and comprising at least two of said service and comfort components including at least an air nozzle (17) and a loudspeaker (15) installed in said lateral blind (13), and supply lines passing through said hollow side rods.

* * * * *

UNITED STATES PATENT AND TRADEMARK OFFICE
CERTIFICATE OF CORRECTION

PATENT NO. : 5,795,018

DATED : August 18, 1998

INVENTOR(S) : Schumacher et al.

It is certified that error appears in the above-identified patent and that said Letters Patent is hereby corrected as shown below:

On the Title Page:
Under "References Cited U. S. PATENT DOCUMENTS" insert:

| | | |
|---|---|---|
| --2,420,251 | 5/1947 | Foriyes |
| 2,602,492 | 7/1952 | Fowler et al. |
| 3,019,050 | 1/1962 | Spielman |
| 3,628,829 | 12/1971 | Hellig |
| 5,316,369 | 5/1994 | Kanda |
| 5,368,359 | 11/1994 | Eakin |
| 5,395,157 | 3/1995 | Rollo et al. |
| 5,564,784 | 10/1996 | Felling--. |

Col. 4, line 53, after "programs" delete "and so forth".

Col. 5, line 1, after "end", replace ";" by --9--;
line 14, after "air", replace "duct" by --ducts--;
line 29, after "FIGS. 1", delete "The opposite end of the armrest 18 is secured to";
line 30, before "and", delete "the bail 8 as shown in Fig. 1.".

Signed and Sealed this

Sixth Day of April, 1999

*Attest:*

Q. TODD DICKINSON

*Attesting Officer*   Acting Commissioner of Patents and Trademarks